3,817,762
MILDEWCIDE FOR PAINT

Loren D. Brake, Wilmington, Del., assignor to E. I. du Pont de Nemours and Company, Wilmington, Del.
No Drawing. Filed Apr. 18, 1973, Ser. No. 352,292
Int. Cl. C09d 5/14
U.S. Cl. 106—15 AF       7 Claims

ABSTRACT OF THE DISCLOSURE

Paints can be made resistant to fungal attack by the incorporation therein of 2-(4-thiazoyl)benzimidazole in admixture with a second fungicide or mixture of fungicides selected from ethylenebis(dithiocarbamic acid), zinc salt; dimethyldithiocarbamic acid, zinc salt; 3,4',5-tribromosalicylanilide; tributyltin fluoride or oxide; or 2-mercaptopyridine-N-oxide, zinc salt.

BACKGROUND OF THE INVENTION

Mercury compounds, such as phenyl mercuric acetate, phenyl mercuric propionate, phenyl mercuric succinate and phenyl mercuric oleate have been used extensively as fungicides in film-forming compositions such as paint. However, recently the use of these mercury compounds is being curtailed in view of possible toxicity problems, particularly when they are employed at high use levels.

Other types of compounds have been proposed for use as fungicides in paint, including benzimidazole type fungicides, see U.S. Pats. 2,933,502, 2,933,504, 3,541,213, 3,631,176 and German Patent Application No. 2,040,069 published Feb. 17, 1972.

However, the need still exists for a safe fungicide for use in paint compositions. Difficulties have been encountered in meeting this need because of the special requirements of this use. Thus the fungicide must not only provide effective fungicidal protection for an extended period of time, both in the formulation and in the applied film, but it must also be compatible with the other components of the formulation, and it must not adversely affect the film appearance or properties.

SUMMARY OF THE INVENTION

I have discovered that a specific mixture of fungicides is extremely effective in protecting paint and paint film from fungal attack. The mixture is composed of the following benzimidazole compound:

2-(4-thiazoyl)benzimidazole

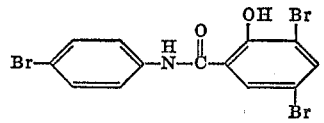

in admixture with a second fungicide or mixture of fungicides selected from (i) ethylenebis(dithiocarbamic acid), zinc salt

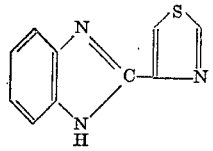

(ii) dimethyldithiocarbamic acid, zinc salt

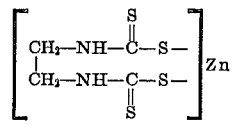

(iii) 3,4',5-tribromo salicylanilide

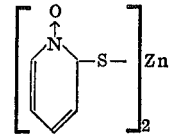

(iv) tributyltin fluoride $(C_4H_9)_3SnF$
(v) tributyltin oxide $[(C_4H_9)_3Sn]_2O$
(vi) 2-mercaptopyridine-N-oxide, zinc salt

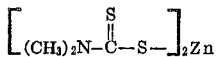

The above mixture is added to paint in the following proportions from 5–20,000 parts per million by weight of the benzimidazole and from 5–50,000 parts per million by weight of the second fungicide or mixture of fungicides.

DESCRIPTION OF THE INVENTION

The components of the mildewcide mixture of the invention are known fungicides. Methods for their preparation can be found in the following references:
2-(4-thiazoyl)-benzimidazole—U.S. Pat. 3,017,415;
ethylenebis(dithiocarbamic acid), zinc salt—U.S. Pat. 2,457,674;
dimethyldithiocarbamic acid, zinc salt—U.S. Pat. 2,229,562;
3,4',5-tribromosalicylanilide—U.S. Pat. 2,967,885;
tributyltin fluoride—U.S. Pat. 3,036,103;
tributyltin oxide—Chem. Eng. Progress, 58, No. 9, 71–5 (1962);
2-mercaptopyridine-N-oxide, zinc salt—U.S. Pat. 2,809,971.

The mixtures of the invention offer a safe, effective fungicide for film-forming compositions. Fungus mycelia are killed or prevented from developing by the presence of these mixtures, i.e., the mixture is fungicidal or fungistatic. The mixtures are active against many species of fungi, including the various species of the classes *Pencillium*, *Aspergillus*, Ceratostomella, *Aureobasidium*, *Botrytis*, *Cladosporium*, *Fusarium*, and *Curvularia*, which fungi grow on paint, fabric, paper, wool, fiberboard, and leather goods.

The mixtures of this invention also make possible the control of damage by fungi with an amazingly small amount of chemical and surprisingly little effort. These advantages are due in large measure to the fact that the mixtures when properly applied, can prevent the growth of fungi in film-forming compositions. This means that the treated surface can be protected from fungi with the application of the mixture in the film-forming or coating composition. The mixtures also have the property of protecting the film-forming composition prior to application, i.e., they act as fungicidal preservatives for the paint, etc. in the container.

Luggage, shoes, leather, shower curtains, carpets, mats, clothing, grouting, wood, fiberboard, caulks, sealants, adhesives, joint cements, roofing materials, tenting, fabric and other useful household, public or industrial items are also protected from rot, fungus stains and unsightly mold growth by the mildewcide mixtures of this invention. Either surface or deep protection can be obtained. Surface treatment is by dips, washes, sprays, aerosols or dust applications. Deep treatment is accomplished by penetrating solutions or by incorporation into the material. Protection from unsightly stain and mold growth is achieved by incorporating 5–20,000 parts per million by weight of the benzimidazole and 5–50,000 parts per million by weight of the other fungicide or mixture of fungicides. More preferred rates are in the range of 100–5,000 parts per million by weight of the benzimidazole and 50–15,000 parts per million by weight of the other fungicides or mixtures of fungicides and the most preferred rates are in the range of 300–2,000 parts per million by weight of the benzimidazole and 75–10,000 parts per million by weight of the other fungicide or mixture of fungicides.

The most efficient distribution and utility of the active fungicidal components of the mixture will be realized if their particle size is less than 50 microns. Larger particle sizes can, of course, be used; however an effective distribution in the resulting film will require higher concentrations to achieve the desired protection. The desired particle size can be obtained using grinders, e.g., sand grinder, ball mills, micropulverizers, air mills, or other methods known in the art. A combination of two or more of the pulverizing methods may be employed.

The mixture can be incorporated into the film-forming composition in the amounts and by the techniques described in the following paragraphs.

The mixture is present in the compositions in an amount such that solid films prepared from the compositions have useful fungicidal properties for the particular end-use application. One skilled in the art, after realizing the essence of the invention set forth in this disclosure, will be able to select the fungicide concentration that gives the best combination of film physical properties and fungicidal properties in the final product for the particular composition and application method employed in the practice of this invention. If not enough active fungicide is present, films of the composition will not have sufficient fungicidal properties, either initially or after a short period of use. If too much fungicide is present, films of the composition tend to be unduly expensive.

Coated surfaces and their substrates can be protected from unsightly stain and mold growth by incorporating in the film-forming formulation, prior to application, 5 to 20,000 parts per million by weight of the benzimidazole and 5 to 50,000 parts per million by weight of the other fungicide or mixtures thereof. Such treatments with the active mixture also protect the paint while still in the can from deformation by fungi.

It is preferred that the benzimidazole be in the range of 100–5,000 parts per million by weight, the most preferred range is 300–2,000 parts per million by weight.

The other fungicides can be divided into two groups. Group A includes ethylenebis (dithiocarbamic acid), zinc salt; dimethyldithiocarbamic acid, zinc salt; and 3,4′,5-tribromosalicylanilide. Group B includes tributyltin fluoride; tributyltin oxide; and 2-mercaptopyridine-N-oxide, zinc salt.

It is preferred that the compounds of Group A be used in the range of 1,000–15,000 parts per million by weight, the most preferred range is 3,000–10,000 parts per million by weight. It is preferred that the compounds of Group B be used in the range of 10–3,000 parts per million by weight, the most preferred range is 75–1,000 parts per million by weight.

The preferred second fungicide selected from Group A is ethylenebis(dithiocarbamic acid), zinc salt and dimethyldithiocarbamic acid, zinc salt; the most preferred is ethylenebis(dithiocarbamic acid), zinc salt; and from Group B is tributyltin fluoride and tributyltin oxide; the most preferred is tributyltin fluoride.

The mixtures of the invention often demonstrate improved assistance to tunsal attack if the film forming composition contains zinc oxide, e.g. as a pigment.

Preferred embodiments of the novel compositions are in the form of liquid coating compositions wherein the mixture of film-former and the active mixture is dispersed in a liquid adapted for use in preparing a film-former solution or suspension.

For example, very beneficial results are obtainable when the composition is in the form of a latex paint or latex adhesive wherein (1) the liquid phase is predominantly water (2) the resin or other film-former is insoluble in the liquid phase, and (3) the film-forming components and the fungicide mixture are present as very small particles suspended or emulsified in the liquid.

Good results are also obtainable when the liquid phase in which the film-forming components and the fungicide mixture are dispersed is predominantly a volatile organic liquid, and film-former is present as a solution in said liquid.

The term "film-forming compositions" as used in this application, is meant to cover paints such as alkyd, acrylic, vinyl acrylic, alkyd modified acrylic or alkyd modified vinyl acrylic paints, enamels, lacquers, varnishes, or any other film-former or binder which is known in the art to be useful in the manufacture of solid (nonliquid) films or coatings. The term "film-former" refers to the polymer, e.g., synthetic resins, natural resins or elastomers, wax, drying oil component, or mixtures thereof present either in the formulation prior to application or in the final film. Film-formers are sometimes referred to the the art as binders, especially in compositions containing pigments or fillers.

Typical formulations for film-forming compositions are described in the following U.S. patents, U.S. 3,261,796, U.S. 2,868,752, U.S. 2,868,754, U.S. 2,787,603, U.S. 3,113,038 and U.S. 3,032,521, and in "Formulation of Organic Coatings" by N. I. Gaynes, D. Van Nostrand Co., Inc. (1967).

One type of film-former which can be used, especially when the composition is a latex, is one composed of about 50–100% by weight of an amino ester polymer which may be defined as a vinyl addition polymer having attached to the carbon-carbon chain monovalent radicals of the formulas

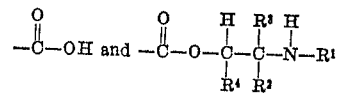

wherein $R^1$ is selected from the group consisting of hydrogen, benzyl and $C_1$–$C_{10}$ alkyl radicals, and $R^2$ and $R^3$ are selected individually from the group consisting of hydrogen, benzyl, aryl and $C_1$–$C_{10}$ alkyl radicals, and $R^4$ is selected from the group consisting of hydrogen and $C_1$–$C_5$ alkyl radicals. In this preferred kind of composition, about 1–50% by weight of the film-former can be composed of another film-former which one skilled in the art can select as having suitable compatibility with said amino-ester polymer. Said amino ester polymer can be prepared by various methods well-known in the art; for example, according to the procedure described in U.S. Pat. 3,261,796.

Another useful type of film-former to use in both the latex and solution compositions is one composed of about 50–100% by weight of an acrylic polymer selected from the group consisting of poly(alkylacrylates), poly(alkylmethacrylates), and copolymers of an alkylacrylate and an alkylmethacrylate.

Other useful film-formers are alkyd resins, oil-modified alkyd resins, formaldehyde condensate resins, epoxy resins, cellulose ester resins, shellac, vinyl chloride resins, acrylic acid copolymers, polyurethanes, acrylonitrile/alkyl acrylate copolymers, acryloxy alkyl-oxazolidene resins, and mixtures of two or more such film-formers.

For aerosol spray application, the composition can be packaged in known aerosol containers along with any suitable propellant, for example, dichlorodifluoromethane.

The composition can contain one or more of the additives known to be useful in film-forming compositions, for example curing agents, driers, anti-freeze agents, pigments, wetting agents, anti-foamers, coalescent agents, odor controllers, a bactericide, plasticizers, stabilizers, viscosity controllers, surfactants and anti-settling agents. The use of a bactericide is often particularly desirable to complement the fungicidal compounds in protecting the film-forming composition both in the can and once applied.

The active fungicide mixture can be incorporated into the film-forming composition in a variety of ways as will be apparent to one skilled in the art. For example, the mixture can be added as a fine powder to the otherwise completed formulation, and the composition stirred until a uniform mixture is obtained. Alternatively, the powdered mixture may be blended with the film-former or with the pigment if one is used, prior to formulation.

It is particularly desirable to incorporate the fungicide mixture into the film-forming composition prior to any grinding or blending step which would normally be done in preparing the formulation. In this way, the fungicide mixture is uniformly dispersed and no extra grinding or blending step is required.

A preferred procedure for paint formulations, where the pigment must be ground or disaggregated and dispersed in the vehicle, is to add the fungicide mixture prior to this grinding step.

In the interest of avoiding any undue harm to the active ingredients, the compositions of the invention preferably have a pH of about 1–10 and a processing temperature in forming the solid film of less than 200° C. if the temperature is to be applied over a period of several hours, or if shorter times are involved, temperatures up to 300° C. can be tolerated.

The composition can be formed into solid films or coatings by any suitable known coating or film-forming method; for example, spraying, rolling, brushing, knife-spreading, dipping, calendering, extruding, electrocoating, flow coating, or by a powder coating process wherein a layer of powdered coating composition is converted to a solid film (e.g., by a heating or hot-pressing method followed by cooling). However, the processing limitation previously set forth should be considered in utilizing these methods.

Paints, lacquers, adhesives and other types of film-forming compositions are obtainable according to the present invention which have beneficial utility for the preparation of solid films and coatings. For example, these compositions enable one to prepare coatings having a very desirable combination of properties including (1) effective initial fungicidal characteristics, (2) low toxicity to humans and warm-blooded animals, (3) satisfactory durability, adhesion, appearance and the like; (4) reasonable cost, (5) surprising ability to prevent or inhibit growth of fungi even after repeated exposure to rain and sunlight.

The compositions are very useful for coating articles and surfaces which are likely to be used under conditions which favor the growth of fungi, for example, in warm, humid areas. The utility of the compositions is especially beneficial in applications where low toxicity to humans and warm-blooded animals is important, for example, in coating the interior of buildings used for the manufacture of foods and medicines.

A variety of substrates may be protected by the incorporation of the compounds of this invention into film-forming compositions which are then applied to the substrate and result in an adherent, solidified layer. Wood, fabric, metal, leather, polymer coated or polymeric sheet materials, fiber board, paper and other industrial materials are protected from unsightly stain and destructive decay caused by fungi.

The following examples are offered to illustrate the film-forming compositions of the invention.

EXAMPLE 1

A latex house paint formulation contains the following ingredients:

| | Parts by weight |
|---|---|
| Hydroxyethyl cellulose (2.5% solution) | 85 |
| Water | 68.5 |
| Nonionic dispersing agent: Tamol 731 (25%), sold by Rohm & Haas | 15 |
| Wetting agent: Triton CF–10, sold by Rohm & Haas | 2.5 |
| Antifoamer: Nopco NDW, sold by Nopco | 1 |
| Ethylene glycol | 25 |
| Non-chalking rutile titanium dioxide | 250 |
| Talc | 203.7 |

The above materials are ground in a high-speed mill and let down, at a slower speed, as follows:

| | Parts by weight |
|---|---|
| Acrylic resin: Rhoplex AC–388 (50%), sold by Rohm & Haas | 459.8 |
| Antifoamer: Nopco NDW | 1 |
| Premix: | |
|     Ammonium hydroxide (28%) | 2 |
|     Tributyl phosphate | 11.5 |
|     Propylene glycol | 35 |
|     Water and/or hydroxyethyl cellulose (2.5%) | 17.5 |

To 1000 parts of the paint formulation described above is added 2 parts of finely divided (<35 microns) 2-(4-thiazoyl)benzimidazole and 6 parts of ethylenebis-(dithiocarbamic acid), zinc salt. The resulting mixture is then thoroughly mixed.

Clapboard siding can be painted with two coats of the completed latex paint, using an ordinary paint brush. The paint film, after being allowed to air dry and age under ordinary atmospheric conditions will have excellent resistance to fungal attack, cracking and blistering and good retention of appearance in general.

The clapboard siding substrate can be either new or a siding that has been previously painted.

Equal weights of the following compounds can be substituted for the ethylenebis(dithiocarbamic acid), zinc salt:

dimethyldithiocarbamic acid, zinc salt
3,4',5-tribromo salicylanilide.

EXAMPLE 2

An oil base house paint formulation containing the following ingredients is used in the following test.

| | Parts by weight |
|---|---|
| TI-pure R–966 (titanium dioxide) | 300 |
| Talc, stir-in grade | 315 |
| Long oil alkyd, "Dyal XAC–C129," sold by Sherwin-Williams Co. | 400 |
| 24% lead naphthenate | 6.9 |
| 6% manganese naphthenate | 1.4 |
| Heavy mineral spirits | 169 |

To 1000 parts of the paint formulation described above is added 2 parts of 2-(4-thiazoyl)benzimidazole and 7.5 parts ethylenebis-(dithiocarbamic) acid, zinc salt. The resulting mixture is thoroughly mixed. A clapboard siding can be painted with two coats of this fungicidal oil base formulation, using an ordinary paintbrush. After the paint film is allowed to dry, the clapboard will be resistant to fungal attack.

An equal weight of the following compound can be substituted for the ethylenebis(dithiocarbamic acid), zinc salt:

3,4',5-tribromo salicylanilide.

EXAMPLE 3

A latex house paint formulation contains the following ingredients:

| | Parts by weight |
|---|---|
| Hydroxyethyl cellulose (2.5% solution) | 85 |
| Water | 68.5 |
| Nonionic dispersing agent: Tamol 731 (25%), sold by Rohm & Haas | 15 |
| Wetting agent: Triton CF–10, sold by Rohm & Haas | 2.5 |
| Antifoamer: Nopco NDW, sold by Nopco | 1 |
| Ethylene glycol | 25 |
| Non-chalking rutile titanium dioxide | 250 |
| Talc | 203.7 |

The above materials are ground in a high-speed mill and let down, at a slower speed, as follows:

| | Parts by weight |
|---|---|
| Acrylic resin: Rhoplex AC-388 (50%) | 390.8 |
| Long oil alkyd: Cargill 7700, sold by Cargill, Inc. | 30.8 |
| Antifoamer: Nopco NDW | 1 |
| Premix: | |
| Ammonium hydroxide (28%) | 2 |
| Tributyl phosphate | 9.8 |
| Propylene glycol | 35 |
| Water and/or hydroxyethyl cellulose (2.5%) | 53.5 |

To 1000 parts of the paint formulation described above is added 1 part of finely divided (<35 microns) 2-(4-thiazoyl)benzimidazole and 1 part 2-mercaptopyridine-N-oxide, zinc salt. The resulting mixture is then thoroughly mixed.

A clapboard siding can be painted with two coats of the completed alkyd modified latex paint, using an ordinary paint brush. The paint film after being allowed to air dry and age under ordinary atmospheric conditions will have excellent resistance to fungal attack.

Equal weights of the following compounds can be substituted for the 2-mercaptopyridine-N-oxide, zinc salt:

tributyltin fluoride;
tributyltin oxide.

EXAMPLE 4

A latex house paint formulation contains the following ingredients:

| | Parts by weight |
|---|---|
| Water | 65 |
| Ethylene glycol | 35 |
| Anionic dispersing agent: Tamol 850, sold by Rohm & Haas | 10 |
| Nonionic wetting agent: Igepal CTA–639, sold by GAF Corp. | 3 |
| Antifoamer: Colloid 677, sold by Colloids, Inc. | 1 |
| Thickener: Natrosol 250 HR (1.5% solution, sold by Hercules, Inc. | 165 |
| Non-chalking rutile titanium dioxide | 275 |
| Extender: Optiwite, sold by Burgess, Inc. | 35 |
| Celite 281, sold by Johns-Manville | 25 |

The above materials are ground in a high-speed mill and let down, at a slower speed, as follows:

| | Parts by weight |
|---|---|
| Water | 46 |
| Vinyl acrylic resin: Resyn 2345, sold by National Starch and Chemical Corp. | 364 |
| Nonionic wetting agent: Igepal CTA–639 | 6.5 |
| Antifoamer: Colloid 677 | 1.5 |
| Coalescent: Carbinol Acetate, sold by Union Carbide | 12 |
| Thickener: Natrosol 250 HR (1.5% solution) | 66 |

To 1000 parts of the paint formulation described above is added to 0.5 parts of finely divided (<25 microns) 4 - (4 - thiazoyl)benzimidazole and 5 parts dimethyldithiocarbamic acid, zinc salt. The resulting mixture is then thoroughly mixed.

A clapboard siding can be painted with two coats of the completed latex paint, using an ordinary paint brush. The paint film after being allowed to air dry and age under ordinary atmospheric conditions will have excellent resistance to fungal attack.

Equal weights of the following compounds can be substituted for the dimethyldithiocarbamic acid, zinc salt:

ethylenebis(dithiocarbamic acid), zinc salt;
3,4',5-tribromosalicylanilide.

EXAMPLE 5

A latex house paint formulation contains the following ingredients:

| | Parts by weight |
|---|---|
| Water | 65 |
| Ethylene glycol | 35 |
| Anionic dispersing agent: Tamol 850, sold by Rohm & Haas | 10 |
| Nonionic wetting agent: Igepal CTA–639, sold by GAF Corp. | 3 |
| Antifoamer: Colloid 677, sold by Colloids, Inc. | 1 |
| Thickener: Natrosol 250 HR (1.5% solution), sold by Hercules, Inc. | 165 |
| Non-chalking rutile titanium dioxide | 275 |
| Extender: Optiwite, sold by Burgess, Inc. | 35 |
| Celite 281, sold by Johns-Manville | 25 |

The above materials are ground in a high-speed mill and let down, at a slower speed, as follows:

| | Parts by weight |
|---|---|
| Water | 46 |
| Vinyl acrylic resin: Resyn 2345, sold by National Starch and Chemical Corp. | 275 |
| Nonionic wetting agent: Igepal CTA–639 | 6.5 |
| Dryer: | |
| 6% cobalt naphthanate, sold by Nuodex, Inc. | 1.5 |
| 24% lead naphthanate | 3.0 |
| Long oil alkyd: Cargill 7700, sold by Cargill, Inc. | 37.0 |
| Antifoamer: Colloid 677 | 1.5 |
| Coalescent: Carbinol Acetate, sold by Union Carbide | 12 |
| Thickener: Natrosol 250 HR (1.5% solution) | 66 |
| Water | 26.5 |

To 1000 parts of the paint formulation described above is added 5 parts of finely divided (<40 microns) 2-(4-thiazoyl)benzimidazole and 0.2 parts of 2-mercaptopyridine-N-oxide, zinc salt. The resulting mixture is then thoroughly mixed.

A clapboard siding can be painted with two coats of the completed alkyd modified latex paint, using an ordinary paint brush. The paint film after being allowed to air dry and age under ordinary atmospheric conditions will have excellent resistance to fungal attack.

Equal weights of the following compounds can be substituted for the 2-mercaptopyridine-N-oxide, zinc salt:

tributyltin fluoride;
tributyltin oxide.

I claim:

1. A method of protecting paint film from fungal attack comprising incorporating into the paint prior to application from 5 to 20,000 p.p.m. by weight of 2-(4-thiazoyl)benzimidazole and 5 to 50,000 p.p.m. by weight of a second fungicide or mixtures thereof selected from:
    (i) ethylenebis(dithiocarbamic acid), zinc salt,
    (ii) dimethyldithiocarbamic acid, zinc salt,
    (iii) 3,4',5-tribromo salicylanilide,
    (iv) 2-mercaptopyridine-N-oxide, zinc salt,
    (v) tributyltin fluoride, and
    (vi) tributyltin oxide.

2. A paint composition comprising a mixture of a film former, 5 to 20,000 p.p.m. by weight of 2-(4-thiazoyl)- benzimidazole and 5 to 50,000 p.p.m. by weight of a second fungicide or mixtures thereof selected from:
(i) ethylenebis(dithiocarbamic acid), zinc salt,
(ii) dimethyldithiocarbamic acid, zinc salt,
(iii) 3,4′,5-tribromo salicylanilide,
(iv) 2-mercaptopyridine-N-oxide, zinc salt,
(v) tributyltin fluoride, and
(vi) tributyltin oxide.

3. The composition of claim 2 in the form of a liquid coating composition wherein the film-former and compound are dispersed in the liquid.

4. The composition of claim 2 wherein the liquid is water and the film-former is suspended in the water.

5. The composition of claim 2 wherein the liquid is a volatile organic liquid and the film-former is in solution in said liquid.

6. A coated article comprising a substrate having in adherence therewith a solidified layer of the composition of claim 2.

7. The composition of claim 2 containing in addition 2.5 to 10 parts per hundred of zinc oxide.

References Cited
UNITED STATES PATENTS

| | | | |
|---|---|---|---|
| 3,017,415 | 1/1962 | Sarett et al. | 106—15 AF |
| 3,350,211 | 10/1967 | Greenwald | 106—15 AF |

HARRY WONG, Jr., Primary Examiner

U.S. Cl. X.R.

117—127, 138.8, 140, 142, 147; 260—22 CB, 29.6 R, 302 H; 424—270